(No Model.)

S. E. PETTEE.
JOURNAL BOX.

No. 253,225.  Patented Feb. 7, 1882.

WITNESSES
Of. Engel
Jno. Crowell Jr

INVENTOR
Simon E. Pettee
By Leggett & Leggett
ATTORNEYS

UNITED STATES PATENT OFFICE.

SIMON E. PETTEE, OF CLEVELAND, OHIO.

JOURNAL-BOX.

SPECIFICATION forming part of Letters Patent No. 253,225, dated February 7, 1882.

Application filed June 30, 1881. (No model.)

*To all whom it may concern:*

Be it known that I, SIMON E. PETTEE, of Cleveland, in the county of Cuyahoga and State of Ohio, have invented certain new and useful Improvements in Anti-Friction Journal-Boxes; and I do hereby declare the following to be a full, clear, and exact description of the invention, such as will enable others skilled in the art to which it pertains to make and use it, reference being had to the accompanying drawings, which form part of this specification.

My invention relates to anti-friction journal boxes or bearings; and it consists in surrounding a sleeve with a series of rollers which are free to revolve around their own centers and around said sleeve within a casing or box.

Figure 1:
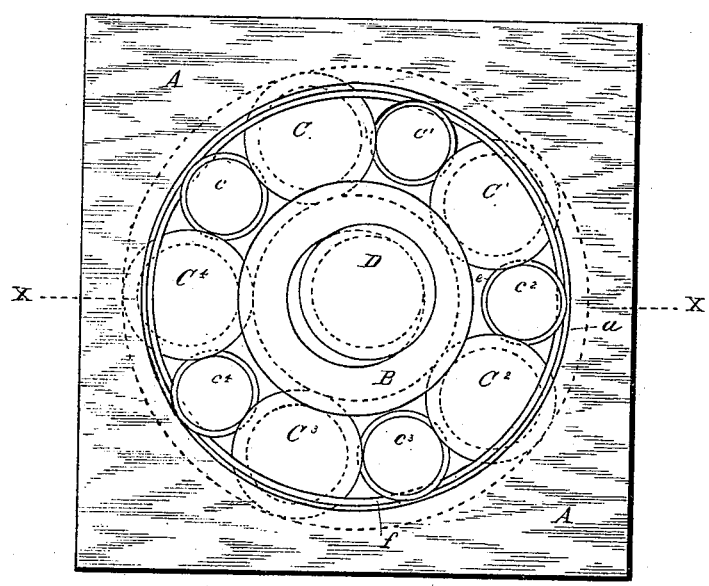
Figure 2:
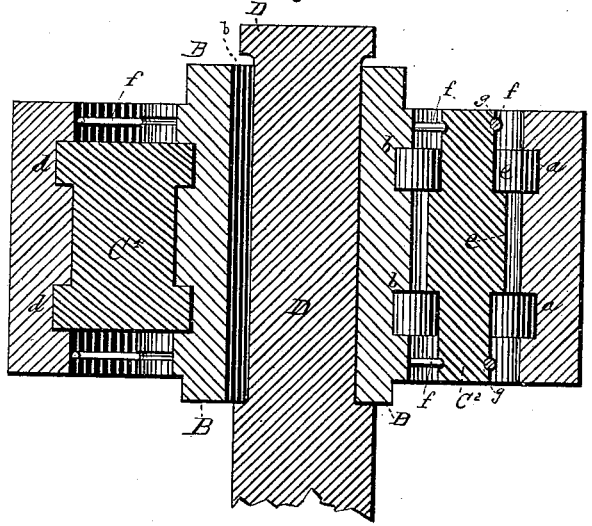

In the drawings, Figure 1 is a plan view of my journal-box, showing the relative arrangement of rolls. Fig. 2 is a section of the same, taken on the line $x\ x$, Fig. 1.

A is a box or casing, which is provided with two grooves, $a\ a$, on its internal circumference. (Represented by dotted lines in Fig. 1.)

B is a sleeve, which is provided on its periphery with two grooves, $b\ b$, which correspond with the grooves $a\ a$ in casing A.

C, C', $C^2$, $C^3$, and $C^4$ are large rollers, which are provided with flanges $d\ d$ at their ends, said flanges being so formed as to run freely in the grooves $a\ a$ and $b\ b$. These rollers are made of such size and shape that they fit snugly between the outside of the sleeve B and the inside of the casing A, and still revolve freely within said space.

$c$, $c'$, $c^2$, $c^3$, and $c^4$ are small intermediate rollers, each of which is provided with an annular projection, $e$, which fits between the end flanges, $d\ d$, of the large rollers C, C', $C^2$, $C^3$, and $C^4$. These small rollers $c$, $c'$, $c^2$, $c^3$, and $c^4$ are placed between the large rollers C, C', $C^2$, $C^3$, and $C^4$, and serve to keep said large rollers from contact with each other, and as they revolve in an opposite direction from the large rollers C, C', $C^2$, $C^3$, and $C^4$, it is obvious that there will be no frictional contact between them. These smaller rollers $c$, $c'$, $c^2$, $c^3$, and $c^4$ are provided with annular grooves $g$ at their outer end, in which rests a circular band, $f$, said band serving to keep the said small rollers in their relative position to the large rollers C, C', $C^2$, $C^3$, and $C^4$, thus binding all the rollers snugly together and obviate any rattling that might otherwise occur. Two of these small rollers may be provided with caps at their outer ends, and thus by removing said caps facilitate the removal or replacement of the band $f$.

It is obvious that the flanges $d$ and $e$ on the rollers C C' $C^2$ $C^3$ $C^4$ and $c\ c'\ c^2\ c^3\ c^4$ may be larger or smaller, and the grooves $a\ a$ and $b\ b$ may also be altered in shape and size, it only being essential that the grooves in the casing A and sleeve B correspond to the flanges on the rollers C C' $C^2$ $C^3$ $C^4$, and that the projection on the small rollers $c\ c'\ c^2\ c^3\ c^4$ correspond with the shape of the space between the flanges of the larger rolls. Thus it will be seen that the rollers and sleeve, while being allowed to revolve freely, are kept from any lateral displacement by means of the grooves and flanges, and a compact and noiseless anti-friction journal is provided.

What I claim is—

1. In an anti-friction journal-box, the combination, with the axle D and casing A, provided with annular grooves $a\ a$, of the sleeve B, provided with a smooth periphery and with annular grooves $b\ b$, and anti-friction rollers interposed between the sleeve and casing, a portion of said rollers being provided with collars which fit within the grooves $a\ a\ b\ b$, substantially as set forth.

2. In an anti-friction journal-box, the combination, with the axle D and casing A, the latter provided with annular grooves $a\ a$, of the sleeve B, having smooth periphery and provided with grooves $b\ b$, and the large and small anti-friction rollers interposed between the sleeve and casing, the large rollers being provided with collars that fit in grooves $a\ a\ b\ b$ and the small rollers provided with enlarged portions that fit between the collars on the large rollers, substantially as set forth.

In testimony whereof I have signed my name to this specification in the presence of two subscribing witnesses.

SIMON E. PETTEE.

Witnesses:
JNO. CROWELL, Jr.,
ALBERT E. LYNCH.